United States Patent [19]
Griffith

[11] 4,106,728
[45] Aug. 15, 1978

[54] FAIL SAFE FORCE FEEL SYSTEM

[75] Inventor: Carl D. Griffith, Phoenix, Ariz.

[73] Assignee: Sperry Rand Corporation, New York, N.Y.

[21] Appl. No.: 760,045

[22] Filed: Jan. 17, 1977

[51] Int. Cl.² .................................................. B64C 13/04
[52] U.S. Cl. .................................. 244/83 D; 74/470; 244/83 J; 318/628; 416/75
[58] Field of Search ...................... 74/469, 470, 471 R, 74/479, 480 R, 523; 244/17, 13, 75 R, 78, 83 D, 83 G, 83 H, 83 J, 85, 178, 194; 318/628; 416/75

[56] References Cited

U.S. PATENT DOCUMENTS

| | | | |
|---|---|---|---|
| 3,002,714 | 10/1961 | Decker | 244/178 X |
| 3,463,423 | 8/1969 | Wong et al. | 244/83 D |
| 3,538,781 | 11/1970 | Ovchinnkov et al. | 244/83 D X |
| 3,747,876 | 7/1973 | Fortna et al. | 244/83 D |

Primary Examiner—Stephen G. Kunin
Attorney, Agent, or Firm—Howard P. Terry; Albert P. Cefalo

[57] ABSTRACT

A force feel system for an aircraft having a control member or stick connected to a boost actuator for positioning an aircraft control surface and a variable force gradient spring mechanism for providing a feedback of artificial forces to the control stick, and which includes non-linear or irreversible linkage apparatus coupled between the stick and the variable force gradient spring such that the force feel system does not require the implementation of monitoring or redundant systems to provide fail safe operation in the event of failure of said force feel system. In addition, the "hands off" stability of the aircraft is not affected by the system because in this "hands off" mode of operation the non-linear linkage apparatus prevents the force actuator from moving the control stick out of the trim position.

10 Claims, 2 Drawing Figures

FAIL SAFE FORCE FEEL SYSTEM

BACKGROUND OF THE INVENTION

1. Field of the Invention

This invention relates to manual control systems for aircraft and, more particularly, to a fail safe artificial force feel system for an aircraft control member generally and more particularly for a helicopter control stick.

2. Description of the Prior Art

Typically, in the manual control of aircraft embodying control surface boost systems, it is desirous to feedback artificial feel forces, such as forces proportional to the g-forces resulting from the manual control of the aircraft, to the control stick to improve the handling qualities thereof (what the pilot would feel in a non-boosted system) and reduce the possibility of overstressing the aircraft during high speed maneuvers. Implementation of variable force feel in helicopters has been accomplished by force actuators or servo positioned springs, driven by "g" signals such as derived from pitch rate and air speed, connected to the control stick. The force actuator or force servo, is coupled to position a spring mechanism, and a servo amplifier drives the force servo to vary the force gradient of a feel spring to provide a feedback of feel forces to the control stick. A position pick-off is provided on the spring to apply inputs to the force servo, thereby commanding the servo to follow a pilot initiated stick movement in the absence of a g-force command. Such electric systems, however, are subject to failure which can drive the control stick with full authority to a hardover position, at a rapid rate. Accordingly, the prior art has resorted to extensive monitoring of the feel force servo system and/or has provided redundant feel force servo systems to, for example, continuously monitor servo system performance and thereby prevent the system from driving the stick to a hardover position. The failure detection or failure monitoring, moreover, must be very rapid, i.e., have a low threshold, which may cause unwanted "nuisance" cut offs during normal operation. In some cases, moreover, the feel system must be switched on and off to prevent undesired stick movements in response to external disturbances to the aircraft. In addition, the prior art systems reflect feedback signals to the stick such that, with the pilot's hand off the stick, the "hands off" mode, the stick responds to the signals, i.e., is moved by the signals, affecting the dynamic stability of the aircraft.

Accordingly, it is desirable to provide a fail safe force feel system which, in addition to providing the desired feedback of artificial feel forces to the stick, also prevents hardover actuation of the stick upon feel system failure, movement of the stick in the "hands off" condition and which does not require the complex electronics and hydromechanical monitoring or redundancy systems found in the prior art.

SUMMARY OF THE INVENTION

In accordance with the teachings of the present invention, the above-mentioned difficulties associated with respect to the prior art, particularly the complex and bothersome force feel electronic servo monitoring required thereby have been overcome thereby providing an artificial force feel system that is mechanically simple, less expensive and more reliable.

Specifically, a force feel system for a control stick connected to a force or boost surface actuator comprises a servo system having a variable force gradient spring for providing a feedback of artificial forces, such as variable g-forces, to the control stick for improving the handling qualities of the aircraft and for reducing the possibility of overstressing the aircraft during high speed maneuvers. Moreover, the force feel system includes non-linear linkage means coupled between the stick and the force gradient spring such that the artificial force feel system is fail safe. In the preferred embodiment of the invention, moreover, the force gradient spring is coupled to the control stick through an irreversible linkage means, for example, a slotted yoke and crank linkage, such that the spring gradient servo forces, e.g., forces in response to external disturbances, producing spring servo activity, do not affect the "hands off" stability of the aircraft. That is, with the pilot's hand off the control stick, motions of the servo varied force gradient spring are not reflected into control stick motion.

More specifically, the preferred embodiment of this invention includes a force servo system responsive to signals proportional to "g" forces and a force gradient spring coupled through a slotted yoke and crank assembly to the control stick. The control stick is connected to the slotted yoke and crank assembly through a magnetic brake device which provides for variations in the stick trim reference position. In addition, a fixed feel spring coupled to the crank provides a fixed force gradient when the force servomotor is disengaged, such as during a failure.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
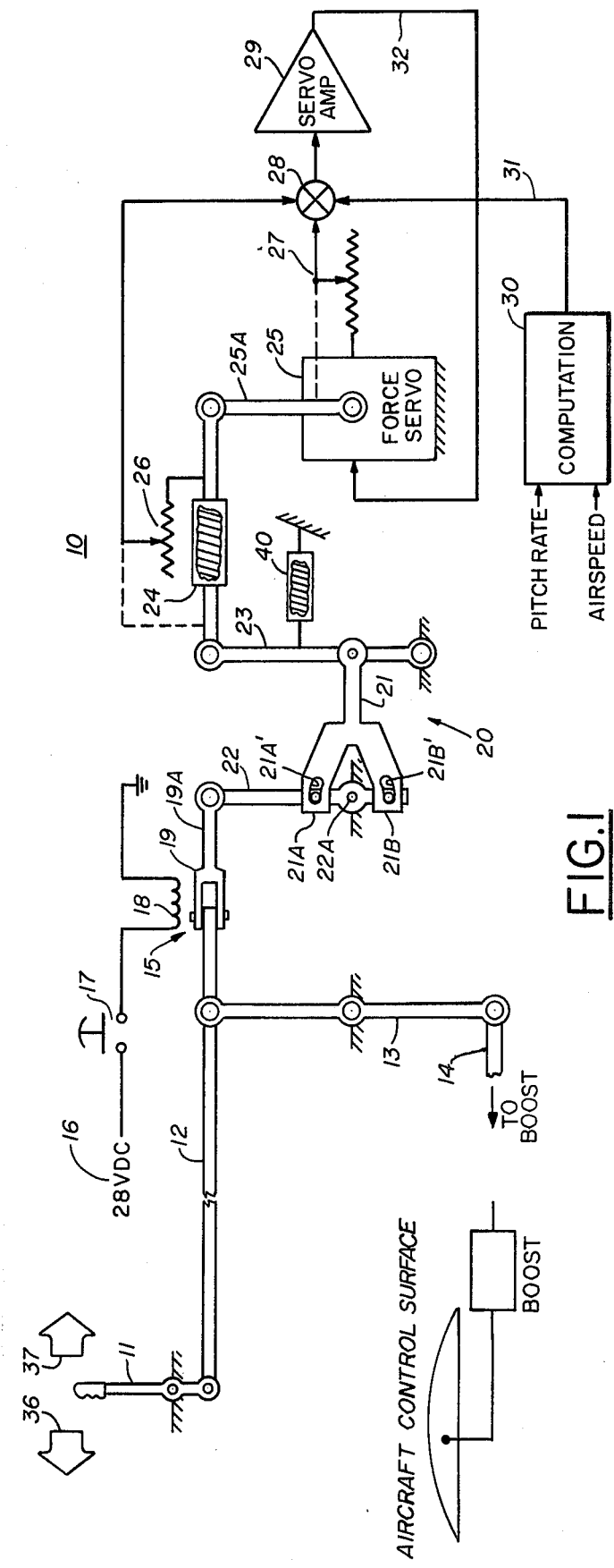
FIG. 1 is a schematic representation of the fail safe force feel system of the invention.

For a more complete appreciation of the invention, attention is invited to the following description of an illustrative embodiment of the invention. Referring to FIG. 1, a fail safe artificial force feel system 10 is shown coupled to a pilot's control stick 11. The control stick 11, which may be the cyclic control stick of a helicopter, is connected by a conventional linkage 12, 13 and 14 to a boost system, conventionally a hydraulic boost actuator which drives an aircraft control surface, for example, the cyclic pitch of the rotor blades of a helicopter. The linkage 12 is coupled through a conventional brake assembly 15, shown here as a magnetic brake, to the force feel system 10. The magnetic brake assembly 15 includes a D.C. power supply 16 coupled through a release switch 17 such as a trim beeper switch on the control stick to a field coil 18 of magnetic brake 19 and one end of the link 12. One end of the linkage 12 is magnetically coupled through the magnetic brake 19, which is shown in FIG. 1 as an open cylindrical end of a link 19A extending in the direction of link 12, and through a non-linear or irreversible linkage means 20 to the force feel system 10. The non-linear linkage means 20 includes, in the illustrated embodiment of the invention, a slotted yoke 21 and a crank 22. The yoke 21 is coupled at one end to the crank 22, which is coupled to the control stick 11, and to a link 23 connected to the other end of the yoke 21. The yoke 21, shown in FIG. 1, in the shape of a "Y", has two end portions 21A, 21B straddling a pivot point 22A of link 22 and coupled to the crank 22 via pin and slot connections 21A' and 21B' on either side of the pivot point 22A. Note that the pins normally abut the ends of the slots so that movement of the crank 22 in either direction moves the yoke in only one direction.

The link 23 is connected to a variable force gradient spring 24 of the force feel system 10, which is connected through linkage means 25A to a force actuator or force servomotor 25. The force gradient spring 24 and the force actuator 25 each include a position feedback transducer 26 and 27, respectively, which are coupled to the spring 24 and the force actuator output arm or linkage 25A, respectively. The outputs from the transducers 26 and 27 are summed in a summing junction 28, the output of which is coupled to a servo amplifier 29. The force feel system 10 also includes a force command computer 30 which is responsive to the aircraft response to a pilot initiated maneuver, such as the "g's" imposed by a pitch maneuver. In the present embodiment, the aircraft motion, pitch rate and airspeed, produce the force command output 31 to produce the necessary "feel" force. It will be appreciated that a vertical accelerometer may provide this signal directly. The output of the force command computer 30 is coupled to the summing junction 28 to provide the "feel" force signal to the amplifier 29 to vary the feel spring gradient in response to the "g" forces produced by the maneuver. The output of the servo amplifier 29 is coupled via lead 32 to the force servo 25 for driving the force servo.

Figure 2:
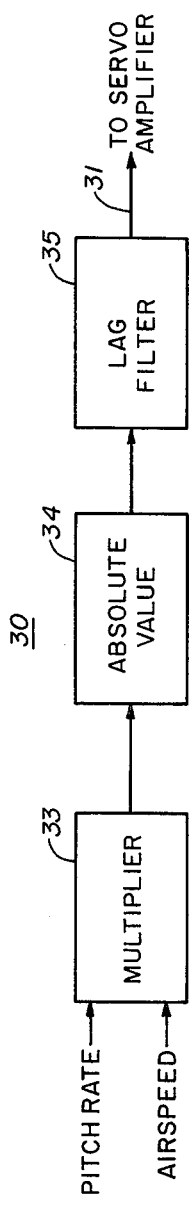
FIG. 2 is a block diagram of the force command computation illustrated in FIG. 1.

Attention is now invited to FIG. 2, wherein the force command computer 30 is shown in block diagram form. The force command 31 is computed from a combination of pitch rate and airspeed which are multiplied together in a multiplier 33; the product of these two variables produces a signal proportional to normal acceleration of "g", thus providing the desired force command term. The output from the multiplier 33 is coupled through an absolute value circuit 34 and a lag filter 35 to produce the force command output 31. The necessity for the absolute value circuit 34 will become apparent in the description of the operation of the invention.

In operation, the magnetic brake 15 is normally engaged, which provides a rigid link from the stick 11 to the force feel system 10 at a particular desired stick trim reference. The non-linear or irreversible linkage means 20, i.e., slotted yoke 21 and crank 22, convert bidirectional motion of the control stick, shown by arrows 36 and 37 in FIG. 1, into unidirectional motion at the spring 24. That is, if the stick 11 is moved in the direction of the arrow 36 the link 12 coupled through the magnetic brake assembly 15 pivots the crank 22 in a clockwise direction. The rotation of the crank 22 displaces the yoke 21 through the pin connection at yoke end 21B pulling link 23 so that the tension of the force gradient spring 24 is felt by the pilot. In like manner, movement of the stick 11 in the direction of arrow 37 rotates the crank 22 counterclockwise, which displaces yoke 21 through the pin connection at yoke end 21A pulling the link 23 against the force of spring 24. Thus, motion of the stick 11 in either direction, 36 and 37, is opposed by the tension of the spring 24, causing it to provide a resisting force to the stick 11 proportional to the "g's" produced on the aircraft by reason of the stick commanded maneuver. As indicated hereinbefore, the absolute value circuit 34 is necessary because of the unidirectional or irreversible characteristics of the mechanization of this invention. The force servo 25, moreover, is a closed loop servo with position feedback 32 and, therefore, provides a stationary reference for the spring 24. Thus, the force command output signal 31, based on the sensed aircraft motion, pitch rate and airspeed, provides the electrical signal to the force servo 25, representative of g-forces, to be coupled through the spring 24 to the stick 11. In the absence of computed forces, however, the electrical position transducer 26 on the spring 21 provides an input to the servo amplifier which commands the servo to follow the stick input, thereby keeping the force gradient on the stick low, wherein the servo gain may be adjusted to provide any desired force gradient.

In accordance with the teachings of the present invention, the force feel system 10 causes the force to be felt by the pilot through the control stick, but by virtue of the irreversible linkage 20 the force feel system or, more particularly, the force servo 25, cannot cause motion of the control stick 11. That is, when the stick 11 is in its trim position, clockwise travel of the force servo link 25A only extends the spring 24, because the yoke 21 is restrained by both of the pin connections at yoke ends 21A and 21B through slots 21A' and 21B'. For example, counterclockwise rotation of the servo link 25A freely moves the yoke 21 via slots 21A' and 21B' without imparting any motion to the crank 22 due to the extent of the slots in relation to the movement of the yoke resulting from a hardover rotation of the servo link. Thus, the rotation of the servo 25 cannot apply motions to the control stick 11, and hardover failures of the force feel system 10 will not cause any aircraft motion through the boost actuator but merely increases or decreases the pilot's stick forces should the aircraft be in an out-of-trim condition. Moreover, normal or short term pitch rates due to external disturbances likewise cannot cause control stick movement and, therefore, the "hands-off" aircraft stability is not affected. It is further noted in FIG. 1, that a fixed force gradient spring 40 may be coupled to the stick 11 to provide a fixed force gradient, which will provide a backup feel force capability in the event of a failure of the force feel system 10.

As indicated in FIG. 1, the magnetic brake assembly 15 is coupled to the control stick 11 such that adjustment of the stick trim reference may be affected without interference, for example, force coupling, from the force feel system 10. That is, the operation of the release switch 17 releases the magnetic brake 19, uncoupling the link 12 from the brake 19 such that no force from the force feel system 10 can be reflected to the stick 11. The spring 24 remains at its center position as the stick 11 is then set at any desired trim position, and, upon actuation of switch 17, the link 12 is re-coupled to the force feel system 10 at the new stick trim position without a corresponding displacement in the force gradient spring 24.

While the invention has been described in its preferred embodiment, it is to be understood that the words which have been used are words of description rather than limitation and changes within the purview of the appended claims may be made without departing from the true scope and spirit of the invention in its broader aspects.

I claim:

1. A force feel apparatus for aircraft flight controls comprising
    a manual control member for operating an aircraft attitude control surface through a boost actuator,
    a variable artificial feel force gradient spring means,
    a force servosystem connected to said spring means responsive to aircraft motion for varying the force gradient of said spring means, and
    non-linear linkage means connected between said spring means and said manual control member for transmitting control member motions to said spring means and for inhibiting motion of said spring means to said manual control member.

2. The apparatus as set forth in claim 1 wherein said non-linear linkage means includes an irreversible linkage means.

3. The apparatus as set forth in claim 2 wherein said irreversible linkage means comprises
    a first link connected to said manual control member and movable in two directions in response to corresponding movement of said control member, and
    a second link connected to said first link and said spring means and movable in but one direction in response to movement of said control member in said two directions.

4. The apparatus as set forth in claim 3 wherein said first link is pivoted for angular rotation about a pivot point and wherein said second link includes means coupled to said first link at points on either side of said pivot point for converting angular rotation of said first link about said pivot point in either direction to unidirectional motion of said second link.

5. The apparatus as set forth in claim 4 wherein said coupling means includes a pin and slot mechanism.

6. The apparatus as set forth in claim 4 wherein said second link comprises a yoke straddling said pivot point and having slots in the arms thereof and pins on said first link disposed in said slots.

7. The apparatus as set forth in claim 2 wherein said servosystem includes
    servomotor means connected with said spring means for varying the force gradient thereof,
    electronic means responsive to the rate of craft motion produced by movement of said control member for controlling said servomotor to provide a desired force per "g" on said control member, said irreversible linkage means preventing motion of said control member by said servomotor.

8. The apparatus as set forth in claim 7 wherein said electronic means includes means for providing a signal proportional to the absolute value of the product of aircraft rate and airspeed.

9. The apparatus as set forth in claim 2 further including
    brake means for establishing a rigid connection between said irreversible linkage means and said manual control member, and
    means for selectively releasing said brake means whereby the manual control member may be moved independently of said linkage means to establish a required trim attitude of said aircraft.

10. The apparatus as set forth in claim 9 wherein said servosystem includes a force command computer having a multiplier responsive to pitch rate and airspeed of the aircraft, an absolute value circuit coupled to the multiplier and a lag filter coupled to the absolute value circuit to produce a force command signal responsive to flight condition inputs.

* * * * *